US012810050B2

(12) United States Patent
Lin et al.

(10) Patent No.: US 12,810,050 B2
(45) **Date of Patent: *Nov. 24, 2026**

(54) METHOD, SYSTEM AND COMPUTER PROGRAM PRODUCT FOR INTEGRATED CIRCUIT DESIGN

(71) Applicant: TAIWAN SEMICONDUCTOR MANUFACTURING COMPANY, LTD., Hsinchu (TW)

(72) Inventors: Chin-Shen Lin, Hsinchu (TW); Hiranmay Biswas, Hsinchu (TW); Kuo-Nan Yang, Hsinchu (TW); Chung-Hsing Wang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 646 days.

This patent is subject to a terminal disclaimer.

(21) Appl. No.: 18/446,739

(22) Filed: Aug. 9, 2023

(65) Prior Publication Data

US 2023/0401370 A1 Dec. 14, 2023

Related U.S. Application Data

(63) Continuation of application No. 17/527,967, filed on Nov. 16, 2021, now Pat. No. 11,775,725, which is a
(Continued)

(51) Int. Cl.
*G06F 30/392* (2020.01)
*G06F 30/3308* (2020.01)
(Continued)

(52) U.S. Cl.
CPC ........ *G06F 30/392* (2020.01); *G06F 30/3308* (2020.01); *G06F 30/337* (2020.01);
(Continued)

(58) Field of Classification Search
CPC .. G06F 30/392; G06F 30/3308; G06F 30/337; G06F 30/394; G06F 30/398; G06F 2119/06
(Continued)

(56) References Cited

U.S. PATENT DOCUMENTS 5,267,175 A 11/1993 Hooper
6,219,630 B1 * 4/2001 Yonezawa ............ G06F 30/398 716/136
(Continued)

FOREIGN PATENT DOCUMENTS

JP 2012048702 A * 3/2012 ........... H10W 20/43
WO 2010014698 A2 2/2010
WO WO-2011041004 A2 * 4/2011 .......... G06F 30/367

OTHER PUBLICATIONS

Fang et al., "Tile-Based Power Planning during floorplanning", IEEE, 2003, pp. 195-198. (Year: 2003).*
(Continued)

*Primary Examiner* — Phallaka Kik
(74) *Attorney, Agent, or Firm* — Hauptman Ham, LLP

(57) ABSTRACT

A method executed at least partially by a processor includes determining a power parameter associated with a cell in an integrated circuit (IC) layout diagram. In response to the determined power parameter exceeding a design criterion, the method further includes performing a modification of the IC layout diagram, the modification including at least one of altering a placement of the cell in the IC layout diagram or modifying a power delivery path to the cell. The determining the power parameter is performed before a routing operation in the IC layout diagram.

20 Claims, 11 Drawing Sheets

Related U.S. Application Data continuation of application No. 16/592,200, filed on Oct. 3, 2019, now Pat. No. 11,205,032.

(60) Provisional application No. 62/753,247, filed on Oct. 31, 2018.

(51) Int. Cl.
*G06F 30/337* (2020.01)
*G06F 30/394* (2020.01)
*G06F 30/398* (2020.01)
*G06F 119/06* (2020.01)

(52) U.S. Cl.
CPC .......... *G06F 30/394* (2020.01); *G06F 30/398* (2020.01); *G06F 2119/06* (2020.01)

(58) Field of Classification Search
USPC ....... 716/120, 122, 127, 129, 130, 111, 133; 703/14, 18
See application file for complete search history.

(56) References Cited

U.S. PATENT DOCUMENTS

| | | | | |
|---|---|---|---|---|
| 6,389,583 | B1 | 5/2002 | Yamazaki | |
| 6,446,239 | B1 * | 9/2002 | Markosian | G06F 30/392 716/135 |
| 6,449,761 | B1 * | 9/2002 | Greidinger | G06F 30/392 716/122 |
| 7,260,442 | B2 | 8/2007 | Hwang et al. | |
| 7,586,299 | B2 * | 9/2009 | Fujiyama | H03K 17/22 716/109 |
| 7,810,051 | B2 * | 10/2010 | Ohashi | G06F 30/39 716/118 |
| 8,176,445 | B1 | 5/2012 | Qian | |
| 8,180,622 | B2 | 5/2012 | Nasle | |
| 8,195,437 | B2 | 6/2012 | Timmerhoff | |
| 8,712,752 | B2 * | 4/2014 | Lau | G06F 30/3312 716/108 |
| 8,731,731 | B2 | 5/2014 | Nakai | |
| 9,092,250 | B1 * | 7/2015 | Hyser | G06F 9/45558 |
| 9,256,709 | B2 | 2/2016 | Yu et al. | |
| 9,672,050 | B2 * | 6/2017 | Andersson | G06F 40/103 |
| 9,997,911 | B2 | 6/2018 | Huang et al. | |
| 11,205,032 | B2 * | 12/2021 | Lin | G06F 30/392 |
| 11,775,725 | B2 * | 10/2023 | Lin | G06F 30/392 716/120 |
| 2002/0133791 | A1 * | 9/2002 | Cohn | G06F 30/327 716/113 |
| 2003/0154415 | A1 | 8/2003 | Farkas et al. | |
| 2004/0073878 | A1 * | 4/2004 | Hasegawa | G06F 30/39 716/120 |
| 2007/0035280 | A1 * | 2/2007 | Fujiyama | H03K 17/122 323/212 |
| 2008/0109205 | A1 | 5/2008 | Nasle | |
| 2009/0019405 | A1 * | 1/2009 | Harada | G06F 30/367 716/109 |
| 2011/0024869 | A1 * | 2/2011 | Nakajima | H10D 89/10 700/121 |
| 2011/0061038 | A1 * | 3/2011 | Qiao | G06F 30/398 716/122 |
| 2012/0025403 | A1 | 2/2012 | Yokogawa | |
| 2012/0110530 | A1 * | 5/2012 | Yang | G06F 30/398 716/112 |
| 2014/0040838 | A1 | 2/2014 | Liu et al. | |
| 2015/0278429 | A1 | 10/2015 | Chang | |
| 2015/0365089 | A1 * | 12/2015 | Momiyama | G06F 30/392 716/133 |
| 2016/0378888 | A1 * | 12/2016 | Chidambarrao | G06F 30/327 716/135 |
| 2017/0116367 | A1 * | 4/2017 | Bickford | G06F 30/396 |
| 2018/0033729 | A1 * | 2/2018 | Xu | H10W 20/435 |
| 2018/0089354 | A1 | 3/2018 | Chandra et al. | |
| 2019/0147135 | A1 * | 5/2019 | Chang | G06F 30/30 716/110 |
| 2020/0019666 | A1 * | 1/2020 | Lai | G06F 30/398 |
| 2022/0075922 | A1 * | 3/2022 | Lin | G06F 30/396 |

OTHER PUBLICATIONS

Cheng, "Efficient IR Drop Analysis and Alleviation Methodologies Using Dual Threshold Voltages with Gate Resizing Techniques", Journal of Integrated Circuits and Systems, vol. 10, No. 3, 2015, pp. 147-157. (Year: 2015).*

* cited by examiner

METHOD, SYSTEM AND COMPUTER PROGRAM PRODUCT FOR INTEGRATED CIRCUIT DESIGN

RELATED APPLICATIONS

The instant application is a continuation of U.S. application Ser. No. 17/527,967, filed Nov. 16, 2021, now U.S. Pat. No. 11,775,725, issued Oct. 3, 2023, which is a continuation of U.S. application Ser. No. 16/592,200, filed Oct. 3, 2019, now U.S. Pat. No. 11,205,032, issued Dec. 21, 2021, which claims the benefit of U.S. Provisional Application No. 62/753,247, filed Oct. 31, 2018. The entire contents of the above-referenced applications and patents are incorporated by reference herein.

BACKGROUND

An integrated circuit (IC) typically includes a number of semiconductor devices represented in an IC layout diagram. The IC layout diagram is generated from an IC schematic, such as an electrical diagram of the IC. At various steps during the IC design process, from the IC schematic to the IC layout diagram for actual manufacture of the IC, various checking and testing are performed to make sure that the IC can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
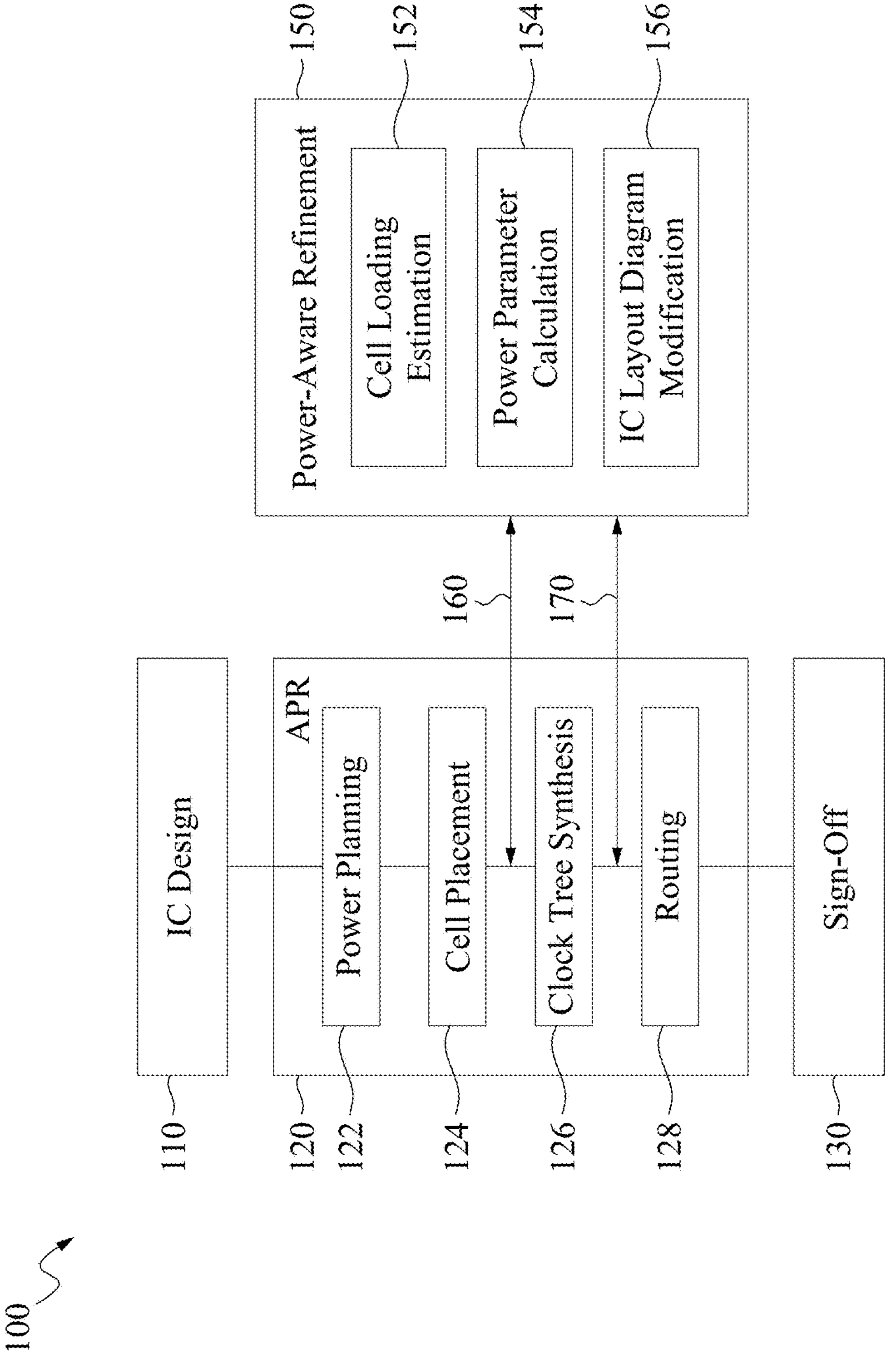
FIG. 1 is a functional flow chart of at least a portion of an IC design flow in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an IC design process, one or more pre-manufacturing verifications are directed to power delivery for various cells in an IC layout diagram of an IC. In some embodiments, a power delivery verification, also referred to as power analysis, is performed after cell placement and before routing. In at least one embodiment, a cell loading of a cell in an IC layout diagram is determined, to subsequently determine a power parameter associated with the cell. Based on the power parameter associated with the cell, a placement of the cell in the IC layout diagram is altered and/or a power delivery path to the cell is modified. As a result, it is possible in some embodiments to identify and correct potential power delivery issues at an early design stage, without breaking the initial design flow.

FIG. 1 is a functional flow chart of at least a portion of an IC design flow 100 in accordance with some embodiments. The design flow 100 utilizes one or more electronic design automation (EDA) tools for generating, optimizing and/or verifying a design of an IC before manufacturing the IC. The EDA tools, in some embodiments, are one or more sets of executable instructions for execution by a processor or controller or a programmed computer to perform the indicated functionality. In at least one embodiment, the IC design flow 100 is performed by a design house of an IC manufacturing system discussed herein with respect to FIG. 10.

At IC design operation 110, a design of an IC is provided by a circuit designer. In some embodiments, the design of the IC comprises an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats for describing the design are usable in some embodiments. In some embodiments, a pre-layout simulation is performed on the design to determine whether the design meets a predetermined specification. When the design does not meet the predetermined specification, the IC is redesigned. In at least one embodiment, a pre-layout simulation is omitted.

At Automatic Placement and Routing (APR) operation 120, a layout diagram of the IC is generated based on the IC schematic. The IC layout diagram comprises the physical positions of various circuit elements of the IC as well as the physical positions of various nets interconnecting the circuit elements. For example, the IC layout diagram is generated in the form of a Graphic Design System (GDS) file. Other data formats for describing the design of the IC are within the scope of various embodiments. In the example configuration in FIG. 1, the IC layout diagram is generated by an EDA tool, such as an APR tool. The APR tool receives the design of the IC in the form of a netlist as described herein. The APR tool performs floor planning to identify circuit elements, which are to be electrically connected to each other and which are to be placed in close proximity to each other, for reducing the area of the IC and/or reducing time delays of signals travelling over the interconnections or nets connecting the electrically connected circuit elements. In some embodiments, the APR tool performs partitioning to divide the design of the IC into a plurality of blocks or groups, such as clock and logic groups. In the example configuration in FIG. 1, the APR tool performs power planning operation 122, cell placement operation 124, clock tree synthesis operation 126 and routing operation 128.

At power planning operation 122, the APR tool performs power planning, based on the partitioning and/or the floor planning of the IC design, to generate a power grid structure which includes several conductive layers, such as, metal layers. One metal layer of the metal layers includes power lines or power rails running in one direction, e.g., horizontally in a plan view. Another metal layer of the metal layers includes power lines or power rails running in an orthogonal direction, e.g., vertically in a plan view. An example of a power grid structure is described with respect to FIG. 2B.

At cell placement operation 124, the APR tool performs cell placement. For example, cells configured to provide pre-defined functions and having pre-designed layout diagrams are stored in one or more cell libraries. The APR tool accesses various cells from one or more cell libraries, and places the cells in an abutting manner to generate an IC layout diagram corresponding to the IC schematic.

The generated IC layout diagram includes the power grid structure and a plurality of cells, each cell including one or more circuit elements and/or one or more nets. A circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, planar MOS transistors with raised source/drains, or the like. Examples of passive elements include, but are not limited to, capacitors, inductors, fuses, and resistors. Examples of nets include, but are not limited to, vias, conductive pads, conductive traces, and conductive redistribution layers, or the like.

At clock tree synthesis (CTS) operation 126, the APR tool performs CTS to minimize skew and/or delays potentially present due to the placement of circuit elements in the IC layout diagram. The CTS includes an optimization process to ensure that signals are transmitted and/or arrived at appropriate timings. For example, during the optimization process within the CTS, one or more vias are inserted into the IC layout diagram to add and/or remove slack (timing for signal arrival) to achieve a desired timing.

At routing operation 128, the APR tool performs routing to route various nets interconnecting the placed circuit elements. The routing is performed to ensure that the routed interconnections or nets satisfy a set of constraints. For example, routing operation 128 includes global routing, track assignment and detailed routing. During the global routing, routing resources used for interconnections or nets are allocated. For example, the routing area is divided into a number of sub-areas, pins of the placed circuit elements are mapped to the sub-areas, and nets are constructed as sets of sub-areas in which interconnections are physically routable. During the track assignment, the APR tool assigns interconnections or nets to corresponding conductive layers of the IC layout diagram. During the detailed routing, the APR tool routes interconnections or nets in the assigned conductive layers and within the global routing resources. For example, detailed, physical interconnections are generated within the corresponding sets of sub-areas defined at the global routing and in the conductive layers defined at the track assignment. After routing operation 128, the APR tool outputs the IC layout diagram including the power grid structure, placed circuit elements and routed nets. The described APR tool is an example. Other arrangements are within the scope of various embodiments. For example, in one or more embodiments, one or more of the described operations are omitted.

At sign-off operation 130, one or more physical and/or timing verifications are performed. For example, sign-off operation 130 includes one or more of a resistance and capacitance (RC) extraction, a layout-versus-schematic (LVS) check, a design rule check (DRC) and a timing sign-off check (also referred to as a post-layout simulation). Other verification processes are usable in other embodiments.

An RC extraction is performed, e.g., by an EDA tool, to determine parasitic parameters, e.g., parasitic resistance and parasitic capacitance, of components in the IC layout diagram for timing simulations in a subsequent operation.

An LVS check is performed to ensure that the generated IC layout diagram corresponds to the design of the IC. Specifically, an LVS checking tool, i.e., an EDA tool, recognizes electrical components as well as connections therebetween from the patterns of the generated IC layout diagram. The LVS checking tool then generates a layout netlist representing the recognized electrical components and connections. The layout netlist generated from the IC layout diagram is compared, by the LVS checking tool, with the schematic netlist of the design of the IC. If the two netlists match within a matching tolerance, the LVS check is passed. Otherwise, correction is made to at least one of the IC layout diagram or the design of the IC by returning the process to IC design operation 110 and/or APR operation 120.

A DRC is performed, e.g., by an EDA tool, to ensure that the IC layout diagram satisfies certain manufacturing design rules, i.e., to ensure manufacturability of the IC. If one or more design rules is/are violated, correction is made to at least one of the IC layout diagram or the design of the IC by returning the process to IC design operation 110 and/or APR operation 120. Examples of design rules include, but are not limited to, a width rule which specifies a minimum width of a pattern in the IC layout diagram, a spacing rule which specifies a minimum spacing between adjacent patterns in the IC layout diagram, an area rule which specifies a minimum area of a pattern in the IC layout diagram, etc. In one or more embodiments, at least one of the design rules is voltage-dependent. A DRC that is performed to check compliance of an IC layout diagram with one or more voltage-dependent design rules is referred to as a VDRC.

A timing sign-off check (post-layout simulation) is performed, e.g., by an EDA tool, to determine, taking the extracted parasitic parameters into account, whether the IC layout diagram meets a predetermined specification of one or more timing requirements. If the simulation indicates that the IC layout diagram does not meet the predetermined specification, e.g., if the parasitic parameters cause undesirable delays, correction is made to at least one of the IC layout diagram or the design of the IC by returning the process to IC design operation 110 and/or APR operation 120. Otherwise, the IC layout diagram is passed to manufacture or additional verification processes.

In some other approaches, a power analysis is performed after routing operation 128, e.g., in sign-off operation 130. If a result of the power analysis does not meet one or more design specifications, the power grid structure for delivering power to the cells in the IC layout diagram is to be redesigned or modified, which, in turn, causes changes in cell placement and/or routing. A long turnaround time is potentially expected in such situations. The described disadvantages are avoidable in some embodiments described herein.

In some embodiments, power-aware refinement operation 150 is performed before routing operation 128. As a result, it is possible in some embodiments to identify and correct potential power-related performance at an early design stage.

Power-aware refinement operation 150 is performed by the APR tool or by another EDA tool, and includes cell loading estimation 152, power parameter calculation 154, and IC layout diagram modification 156. One or more examples of cell loading estimation 152 are described with respect to FIG. 2A. One or more examples of power parameter calculation 154 are described with respect to FIG. 2B. One or more examples of IC layout diagram modification 156 are described with respect to FIGS. 3A-3B, 4A-4B, and 5A-5B. In at least one embodiment, power-aware refinement operation 150 is inserted in the IC design flow 100 between cell placement operation 124 and clock tree synthesis operation 126, as indicated at arrow 160 in FIG. 1. In at least one embodiment, power-aware refinement operation 150 is inserted in the IC design flow 100 between clock tree synthesis operation 126 and routing operation 128, as indicated at arrow 170 in FIG. 1. In at least one embodiment, power-aware refinement operation 150 is inserted in the IC design flow 100 both before and after clock tree synthesis operation 126, as indicated at both arrows 160, 170.

In power-aware refinement operation 150, a power analysis is performed in cell loading estimation 152 and power parameter calculation 154, whereas a remedy based on a result of the power analysis is performed in IC layout diagram modification 156. In at least one embodiment, the power analysis is to evaluate the IC layout diagram for potential performance issues associated with at least one of electromigration (EM) or voltage drop (also referred to as IR drop). EM is a design consideration in advanced ICs, where devices, metal lines and vias are shrunk to smaller dimensions while functionalities and/or performance of the ICs are increased. As larger currents associated with higher functionalities flow through narrower metal lines and vias, current densities in the metal lines and vias are increased, causing concerns of EM which involves physical changes or transport of the material of the metal lines and vias due to the currents flowing therethrough. EM causes potential formation of bumps and/or voids in metal lines and/or vias, which potentially leads to short circuit or open circuit and reduces the life span of the IC. IR drop is another design consideration when larger currents flow through narrower metal lines and vias with higher resistance, resulting in increased voltage drops (or IR drops). An excessive IR drop over a power delivery path to a cell results in insufficient power and/or supply voltage at the cell, which, in turn, potentially causes the cell to stop operating, or to operate in a unintended manner, e.g., at a lower frequency.

In at least one embodiment, the power analysis in power-aware refinement operation 150 is based on cell power of one or more cells in the IC layout diagram. Cell power of a cell includes static power and dynamic power. The static power, also referred to as leakage power, is power consumed by the cell when the cell is in a steady state, i.e., when an output of the cell remains at the same level, e.g., either a low level or a high level. The dynamic power is power required to change or switch the output of the cell from one level to another, for example, from the low level to the high level, or vice versa. The dynamic power includes switching power and internal power. The switching power is the power required at the output of the cell during switching. The internal power is the power required inside the cell during switching. Thus, the cell power of a cell is determined by the following equation:

$$P_{Cell}=P_{Leakage}+P_{switching}+P_{Internal} \quad (1)$$

where $P_{Cell}$ is the cell power, $P_{Switching}$ is the switching power, $P_{Internal}$ is the internal power, and $P_{Leakage}$ is the leakage power of the cell.

In at least one embodiment, the leakage power is determined by the following equation:

$$P_{Leakage}=VDD \times I_{s0} \times e^{\alpha T} \quad (2)$$

where VDD is the power supply voltage applied to the cell, $I_{s0}$ is a leakage current from VDD through the cell to the ground, a is a constant related to a process/technology node (e.g., 6 nm, 8 nm, or 10 nm) used to manufacture the IC, and T is an operating temperature of the cell. In at least one embodiment, one or more of VDD, $I_{s0}$, $\alpha$, and T are specified in a cell library from which the cell is retrieved during cell placement operation 124. In at least one embodiment, one or more of $I_{s0}$ and $\alpha$ are obtained by experiments at a semiconductor foundry. The described method of determining leakage power is an example. Other arrangements are within the scopes of various embodiments. In some embodiments, the leakage power is a small component, e.g., less than 1%, of the cell power, and is omitted from the calculation of the cell power. In at least one embodiment, the leakage power, no matter how small, is included in the calculation of the cell power for increased accuracy.

The switching power and internal power depend on a cell loading which is determined in cell loading estimation 152 of power-aware refinement operation 150. One or more examples of cell loading estimation 152 are described with respect to FIG. 2A.

Figure 2A:
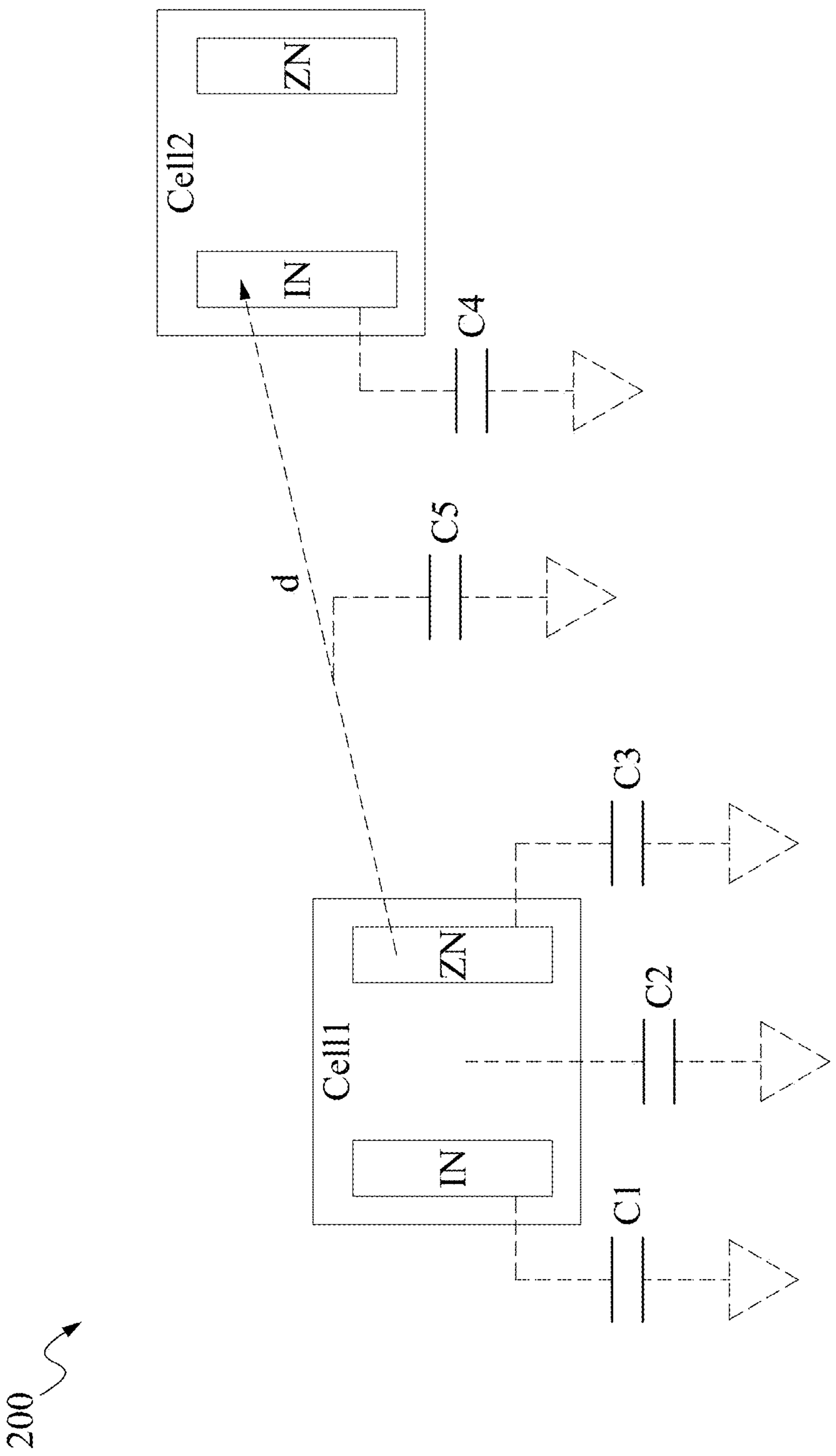
FIG. 2A is a schematic view of a plurality of cells in an IC layout diagram, in accordance with some embodiments.

FIG. 2A is a schematic view of Cell 1 and Cell 2 in an IC layout diagram 200, in accordance with some embodiments. In at least one embodiment, IC layout diagram 200 corresponds to the IC layout diagram obtained as a result of cell placement operation 124 described with respect to FIG. 1. For simplicity, other cells and a power grid structure in IC layout diagram 200 are omitted in FIG. 2A.

Each cell in IC layout diagram 200 has at least one input net IN and at least one output net ZN. In an IC schematic corresponding to IC layout diagram 200, an input signal is inputted to input net IN of each cell, is modified or processed by internal circuitry including one or more circuit elements in the cell, and is outputted as an output signal at output net ZN of the cell. Further, according to the IC schematic corresponding to IC layout diagram 200, output net ZN of Cell 1 is logically coupled to input net IN of Cell 2, to supply the output signal of Cell 1 as an input signal to Cell 2.

In each cell, input net IN is represented by an input capacitance relative to the ground, output net ZN is represented by an output capacitance relative to the ground, and the internal circuitry in the cell is represented by an internal capacitance relative to the ground. For example, Cell 1 is represented by input capacitance C1, internal capacitance C2, and output capacitance C3. Cell 2 is likewise represented by input capacitance C4, internal capacitance (not shown), and output capacitance (not shown). The input capacitance, internal capacitance, and output capacitance of each cell are known or determinable from the one cell library from which the cell is retrieved in cell placement operation 124. For example, C1, C2, C3, and C4 are known or determinable from the corresponding cell library or libraries. An interconnection between output net ZN of Cell 1 and input net IN of Cell 2 is represented by connection capacitance C5 relative to the ground, and C5 is estimated based on a physical distance d between Cell 1 and Cell 2 in IC layout diagram 200. In at least one embodiment, an RC extraction is performed, e.g., by an EDA tool, based on a logical connection in the IC schematic and physical distance d in IC layout diagram 200 between Cell 1 and Cell 2, to estimate C5.

The switching power of each cell is determined by a cell loading at output net ZN of the cell. For example, the cell loading of Cell 1 is determined based on output capacitance C3 of output net ZN of Cell 1, as well as input capacitance C4 of Cell 2 and connection capacitance C5 of the interconnection coupled to output net ZN of Cell 1. In situations where output net ZN of Cell 1 has multiple connections to multiple other cells, the input capacitance of all other cells as well as the connection capacitance of all corresponding interconnections between Cell 1 and the other cells contribute to the cell loading of Cell 1. In at least one embodiment, the switching power is determined by the following equation:

$$P_{Switching}=1/2\times C_{loading}\times VDD^2 \quad (3)$$

where $C_{loading}$ is a capacitance corresponding to the cell loading of the cell. The described method of determining switching power is an example. Other arrangements are within the scopes of various embodiments.

The internal power of each cell also depends on the cell loading. The internal power further depends on the internal capacitance of the cell. For each cell, based on the cell loading and the internal capacitance of the cell, the internal power of the cell is determined.

At power parameter calculation 154, the cell loading determined in cell loading estimation 152 is used to determine at least one of the switching power or the internal power of the cell. Once all leakage power, switching power and internal power of the cell have been determined, the cell power is determined using equation (1). The cell power is then used to determine a power parameter associated with the cell. In some embodiments, the power parameter associated with the cell includes at least one of a power density of a tile containing the cell, an IR drop of the tile containing the cell, or an IR drop of the cell. Other power parameters for a power analysis in power-aware refinement operation 150 are within the scopes of various embodiments. One or more examples of power parameter calculation 154 are described with respect to FIG. 2B.

Figure 2B:
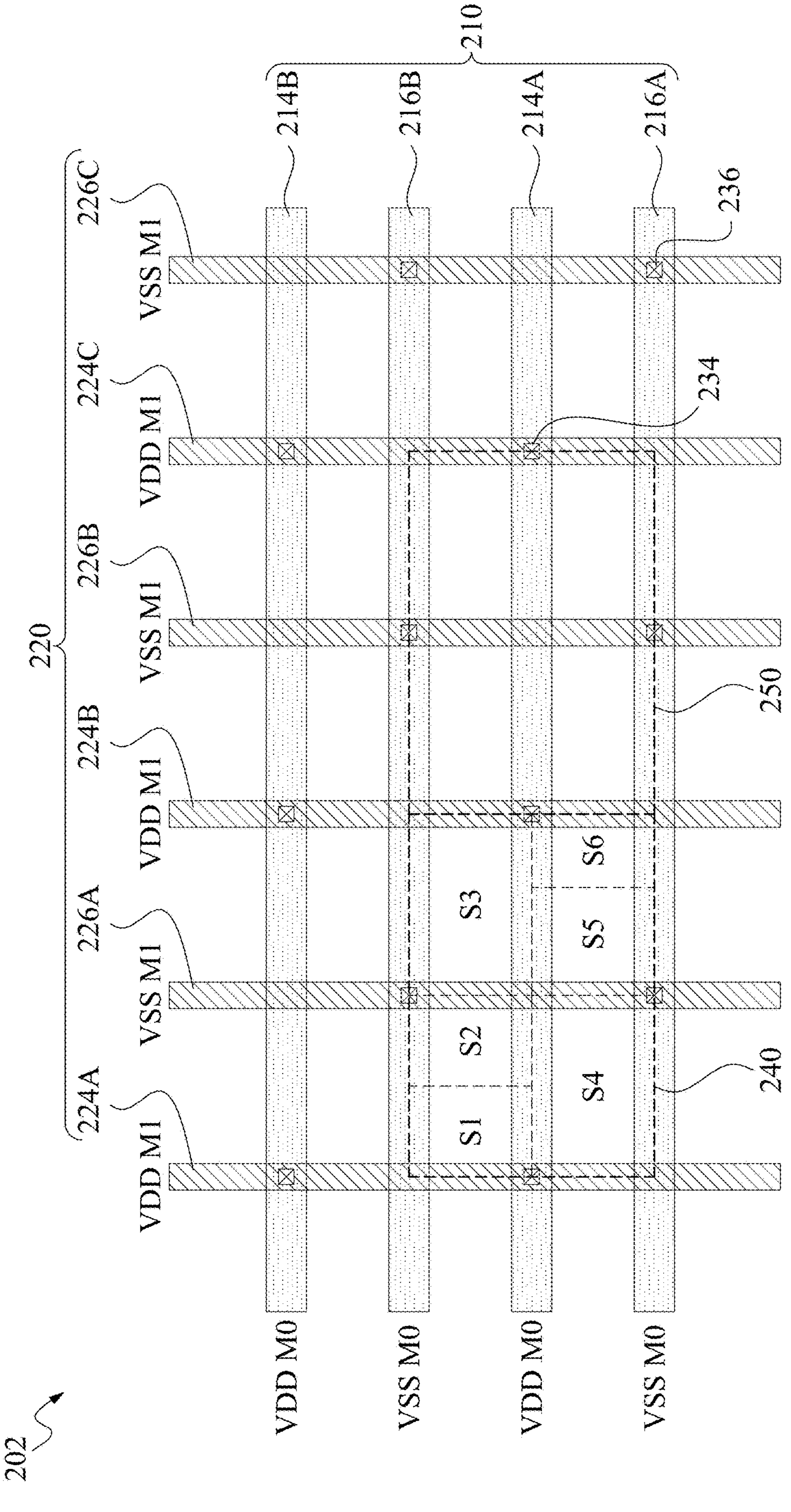
FIG. 2B is a schematic view of a power grid structure in an IC layout diagram, in accordance with some embodiments.

FIG. 2B is a schematic view of a power grid structure 202 in an IC layout diagram, in accordance with some embodiments. In at least one embodiment, power grid structure 202 is generated in power planning operation 112 and included in IC layout diagram 200 discussed with respect to FIG. 2A. For simplicity, various cells in IC layout diagram 200 are omitted in FIG. 2B.

Power grid structure 202 includes a plurality of power lines or power rails arranged in several metal layers. For example, power grid structure 202 includes power rails 210 in metal layer M0, and power rails 220 in metal layer M1. Metal layer M0 is the lowest metal layer in an IC manufactured in accordance with IC layout diagram 200, and metal layer M1 is the metal layer immediately above metal layer M0. Power rails 210 are oriented in a first direction, e.g., the horizontal direction in FIG. 2B. Power rails 220 are oriented in a second direction, e.g., the vertical direction in FIG. 2B, which is transverse to the first direction of power rails 210. Power rails 210 include power supply voltage (VDD) rails 214A, 214B, and ground voltage (VSS) rails 216A, 216B. VDD rails 214A, 214B and VSS rails 216A, 216B are alternatingly arranged at a first pitch. Similarly, power rails 220 include VDD rails 224A, 224B, 224C and VSS rails 226A, 226B, 226C alternatingly arranged at a second pitch. Power grid structure 202 further includes a plurality of vias (also referred to herein as power delivery vias) which couple corresponding VDD rails and VSS rails in different metal layers. For example, at an intersection where VDD rail 224C in the upper metal layer M1 crosses over VDD rail 214A in the lower metal layer M0, a VDD via 234 is arranged to couple the VDD rails 214A, 224C. Similarly, at an intersection where VSS rail 226C in the upper metal layer M1 crosses over VSS rail 216A in the lower metal layer M0, a VSS via 236 is arranged to couple the VSS rails 216A, 226C. The described configuration of power grid structure 202 is an example. Other configurations are within the scopes of various embodiments. For example, in one or more embodiments, power grid structure 202 includes power rails in more than two metal layers and/or in a metal layer other than metal layer M0 and metal layer M1, and/or has more than one power supply voltages.

The crossing power rails in power grid structure 202 define a plurality of tiles, for example, tiles 240, 250 in FIG. 2B. Tile 240 is defined between a pair of adjacent VDD rails 224A, 224B, and a pair of adjacent VDD rails 216A, 216B. Tile 250 is defined between a pair of adjacent VDD rails 224B, 224C, and a pair of adjacent VDD rails 216A, 216B. For simplicity, other tiles defined by the crossing power rails in power grid structure 202 are not shown or numbered in FIG. 2B. At least one cell of IC layout diagram 200 is arranged in a tile of power grid structure 202. For example, cells S1-S6 are arranged in an abutting manner inside tile 240. For simplicity, cells arranged in tile 250 are not shown in FIG. 2B. Cells in a tile are electrically coupled, e.g., by vias (not shown) or power taps (not shown), to one or more of power rails at the boundary of the tile, extending through the tile, or crossing over the title. For example, cells S1-S6 in tile 240 are electrically coupled to one or more of VDD rails 224A, 224B, 214A and to one or more of VSS rails 216A, 216B, 226A. The described arrangements of tiles and/or cells inside a tile are examples. Other configurations are within the scopes of various embodiments. For an example, tiles in power grid structure 202 have different sizes and/or shapes in at least one embodiment. For another example, cells are not necessary to cover the entire area of a tile, e.g., S6 in tile 240 is an empty space not filled by any cell.

As described herein, an example of a power parameter to be determined in power parameter calculation 154 for use in a power analysis of power-aware refinement operation 150 includes a power density of a tile. For example, to determine a power density of tile 240, the cell power of each of cells S1-S6 in tile 240 is determined as described herein. Total cell power in tile 240 is determined as a sum of the cell powers of all cells S1-S6 in tile 240. The power density of tile 240 is determined by dividing the total cell power in tile 240 by a physical area or tile 240. The physical area or tile 240 is determined, for example, from the pitches between adjacent power rails of the power grid structure 202 as described herein. When the determined power density of tile 240 exceeds a power density design criterion, IC layout diagram 200 is modified as described with respect to IC layout diagram modification 156. The power density design criterion is a predetermined design rule depending, e.g., on the process/technology node used to manufacture the IC.

Another example of a power parameter to be determined in power parameter calculation 154 for use in a power analysis of power-aware refinement operation 150 includes an IR drop of a tile. In at least one embodiment, an effective resistance of the tile is determined. For example, an effective resistance of tile 240 is determined, using Kirchhoffs Current Law (KCL) and Kirchhoffs Voltage Law (KVL), and based on currents and/or voltages supplied/flowing in and/or out of cells S1-S6 in tile 240. The currents and/or voltages are determined, for example, from the IC schematic corresponding to IC layout diagram 200. A current value of the tile is determined by dividing the total cell power in the tile by the power voltage (e.g., VDD) supplied to the cells in the tile. The IR drop of the tile is determined by multiplying the current value of the tile with the effective resistance of the tile. When the determined IR drop exceeds an IR drop design criterion, IC layout diagram 200 is modified as described with respect to IC layout diagram modification 156. The IR drop design criterion is a predetermined design rule depending, e.g., on the process/technology node used to manufacture the IC.

In some embodiments, the power parameter for determining whether an IC layout diagram is to be modified includes at least one of a power density or an IR drop of a tile. In at least one embodiment, the power parameter for determining whether an IC layout diagram is to be modified includes both of a power density or an IR drop of a tile. For example, if either of a power density or an IR drop of a tile exceeds a corresponding design criterion, the IC layout diagram is modified in IC layout diagram modification 156.

At IC layout diagram modification 156, the IC layout diagram is modified in response to the power parameter determined at power parameter calculation 154 exceeding a corresponding design criterion. For example, a modification to the IC layout diagram includes at least one of altering a placement of a cell, e.g., as described with respect to FIGS. 3A-3B, or modifying a power delivery path to the cell, e.g., as described with respect to FIGS. 4A-4B.

Figure 3B:
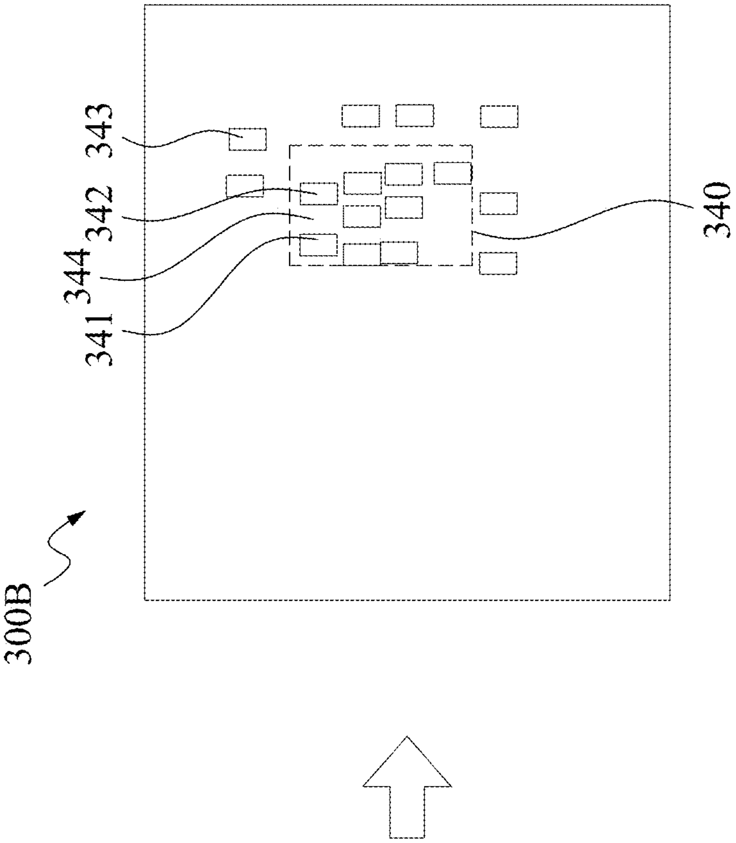
FIG. 3B is a schematic view of modified cell placement in a modified IC layout diagram, in accordance with some embodiments.
Figure 3A:
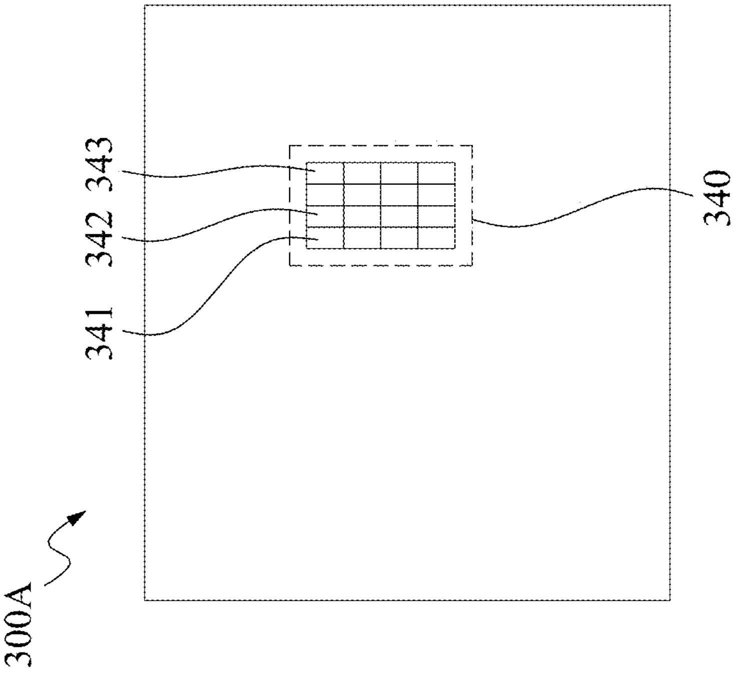
FIG. 3A is a schematic view of cell placement in an IC layout diagram.

FIG. 3A is a schematic view of cell placement in an IC layout diagram 300A, and FIG. 3B is a schematic view of modified cell placement in a modified IC layout diagram 300B, in accordance with some embodiments. In at least one embodiment, IC layout diagram 300A corresponds to IC layout diagram 200 described with respect to FIGS. 2A-2B. IC layout diagram 300A includes a plurality of cells arranged in a plurality of tiles. For example, tile 340 of IC layout diagram 300A includes a plurality of cells 341,342, 343. Other cells and/or tiles of IC layout diagram 300A are not shown and/or not numbered for simplicity. When a power density and/or an IR drop of tile 340 exceeds a corresponding design criterion, a potential issue related to EM and/or IR drop is expected to exist in tile 340. A remedy to such potential EM and/or IR drop issues is to alter cell placement in tile 340, as shown in the example configuration in FIG. 3B.

In the modified cell placement in FIG. 3B, a space between cells of tile 340 is increased to reduce the power density of tile 340. For example, a space between adjacent cells 341, 342 is increased by placing an empty space 344 between cells 341, 342, while keeping cells 341, 342 in tile 340. For another example, a space between cells 341, 343 is increased by moving cell 343 out of tile 340, so that the cell power of cell 343 is no longer contributed to the total cell power of tile 340, thereby decreasing the power density of tile 340. Because the power density of tile 340 is reduced, the total cell power of tile 340 is also reduced, with a lower IR drop of tile 340. As a result, potential issues related to both EM and IR drop are addressable by altering the cell placement of tile 340. With improvements in EM, reliability and/or lifespan of ICs are increased. With improvements in IR drop, intended performance and/or functionality of ICs are ensured.

In at least one embodiment, the alteration of cell placement is performed locally for tiles in a vicinity of a tile (e.g., tile 340) with the excessive power density and/or IR drop. Therefore, processing time is reduced compared to when cell placement is to be re-performed for the whole IC layout diagram 300A, or a substantial thereof. An approach for altering cell placement is to use a different place and route algorithm which results in previously crowded cells to be scattered around in a wider area. Another approach for altering cell placement is to use the same place and route algorithm as in cell placement 124, but with a different timing requirement and/or cell placement priority, with a similar result of scattering previously crowded cells around in a wider area. Other approaches for altering cell placement are within the scopes of various embodiments.

Figures 4A, 4B:
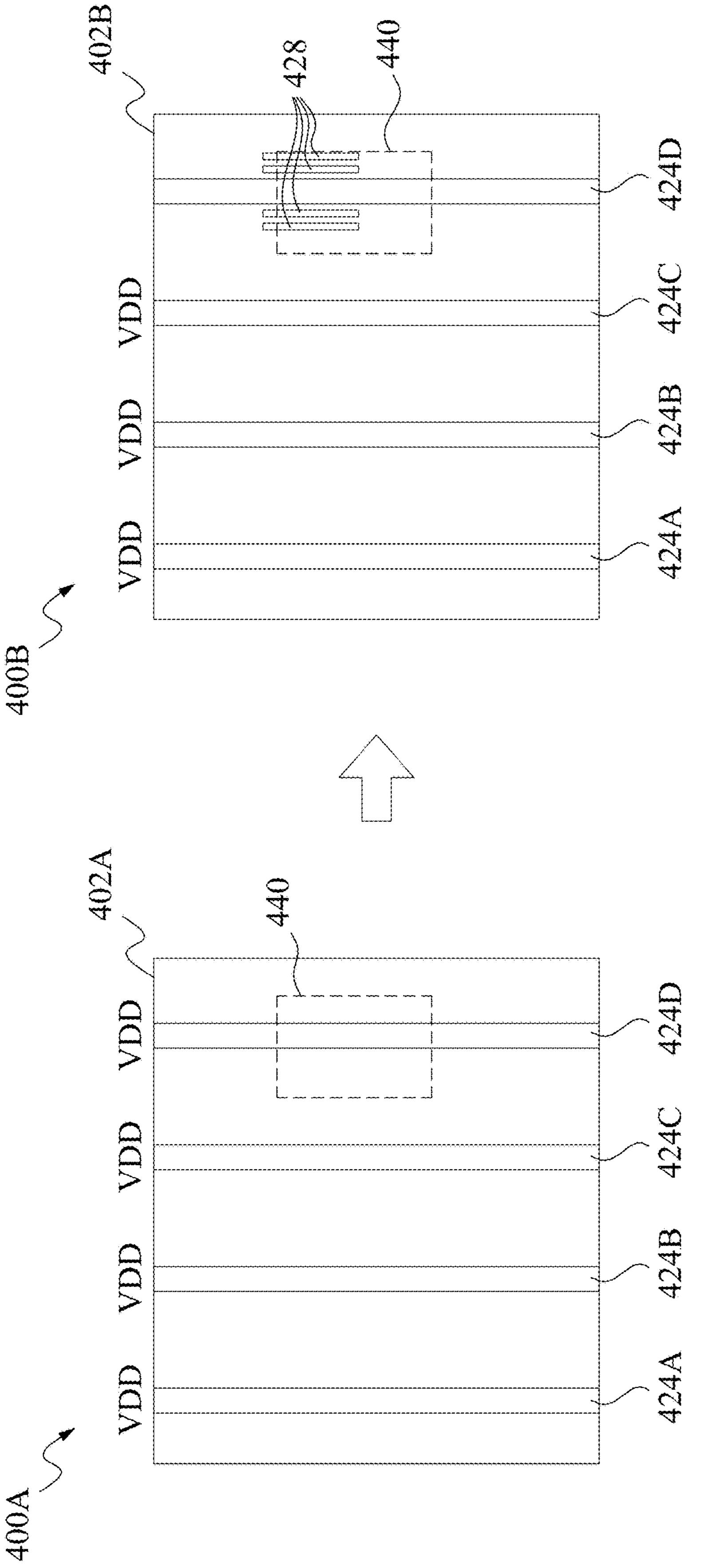
FIG. 4A is a schematic view of a power grid structure in an IC layout diagram.
FIG. 4B is a schematic view of a modified power grid structure in a modified IC layout diagram, in accordance with some embodiments.

FIG. 4A is a schematic view of a power grid structure 402A in an IC layout diagram 400A, and FIG. 4B is a schematic view of a modified power grid structure 402B in a modified IC layout diagram 400B, in accordance with some embodiments. In at least one embodiment, IC layout diagram 400A corresponds to IC layout diagram 200, and power grid structure 402A corresponds to power grid structure 202, described with respect to FIG. 2A and/or FIG. 2B. Power grid structure 402A includes a plurality of power rails for delivering power to a plurality of tiles of IC layout diagram 400A. For example, power grid structure 402A includes VDD rails 424A, 424B, 424C, 424D among which VDD rail 424D is configured to deliver power to tile 440. Other power rails and/or tiles and/or cells of IC layout diagram 400A are not shown and/or not numbered for simplicity. When an IR drop of tile 440 exceeds a corresponding design criterion, a potential issue related to IR drop is expected to exist in tile 440. A remedy to such potential IR drop issue is to modify the power delivery path to the cells in tile 440, as shown in the example configuration in FIG. 4B.

In modified power grid structure 402B in FIG. 4B, at least one of a power delivery metal region or a power delivery via is added to deliver power to tile 440. For example, in addition to VDD rail 424D, modified power grid structure 402B further includes one or more power rails 428 for delivering power to the cells in tile 440. In at least one embodiment, power rails 428 are coupled through one or more power delivery vias (not shown) to one or more existing power rails in power grid structure 402A. The addition of one or more power rails 428 changes the power delivery path to at least one cell in tile 440, e.g., by adding more routes to deliver power to the cell or cells of tile 440. With more power rails added, the effective resistance of tile 440 is reduced, which, in turn, reduces the IR drop of tile 440. As a result, potential issues related to IR drop in a tile are addressable by modifying the power delivery path to the cell(s) in the tile. Further, as the number of power rails configured to supply current for tile 440 is increased, EM issues are reduced, in at least some embodiments.

In at least one embodiment, the modification of the power delivery path is performed locally for a tile (e.g., tile 440) with the excessive IR drop. Therefore, processing time is reduced compared to when power planning is to be re-performed for the whole IC layout diagram 400A, or a substantial thereof. Although the described approach for modifying a power delivery path is to add one or more power rails as part of a power planning operation, other arrangements are within the scopes of various embodiments. For example, in at least one embodiment, one or more power rails are added like signal nets, as part of a routing operation.

Figure 5A:
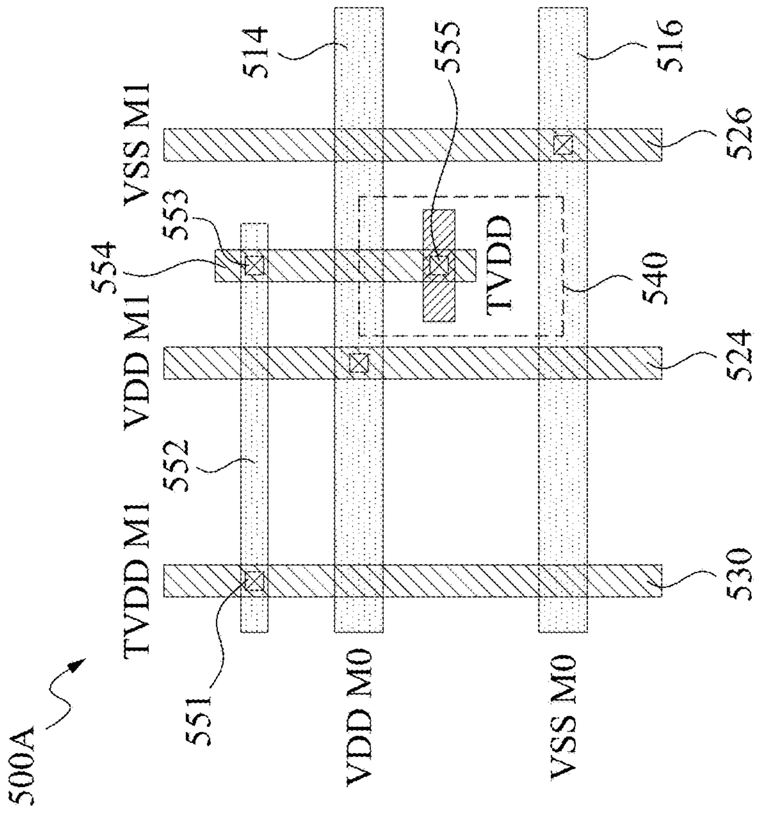
FIG. 5A is a schematic view of a cell with secondary power in an IC layout diagram.
Figure 5B:
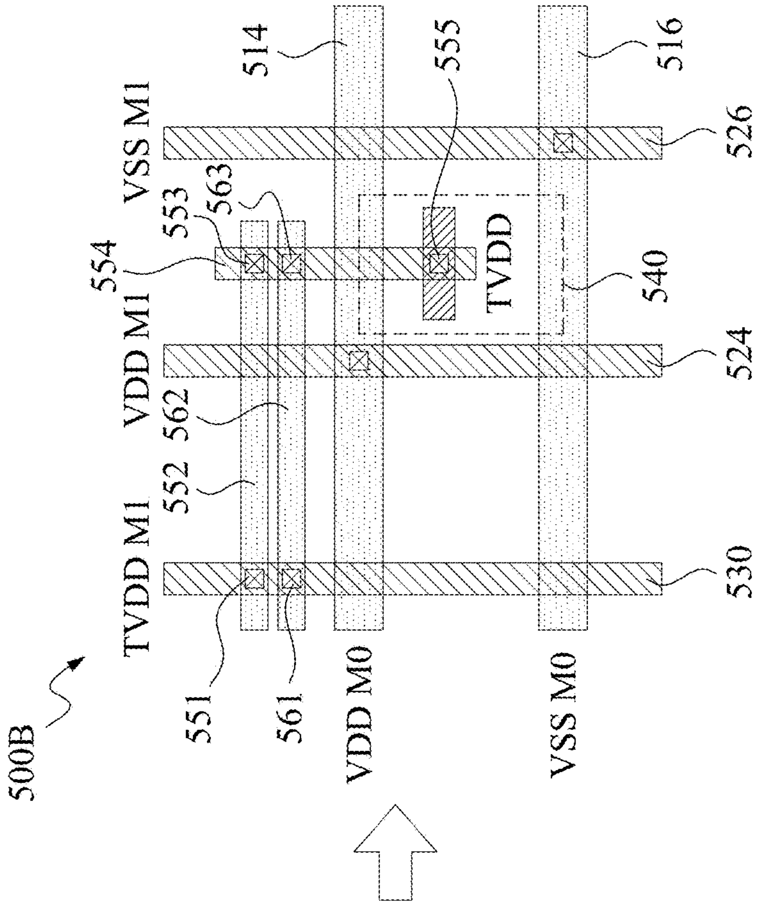
FIG. 5B is a schematic view of the cell with secondary power in a modified IC layout diagram, in accordance with some embodiments.

FIG. 5A is a schematic view of a cell with secondary power in an IC layout diagram 500A, and FIG. 5B is a schematic view of the cell with secondary power in a modified IC layout diagram 500B, in accordance with some embodiments. In at least one embodiment, IC layout diagram 500A corresponds to IC layout diagram 200. IC layout diagram 500A includes a plurality of cells and a power grid structure with a plurality of power rails, as described with respect to FIG. 2A and/or FIG. 2B. For example, IC layout diagram 500A includes a power grid structure with VDD rail 514 in metal layer M0, VSS rail 516 in metal layer M0, VDD rail 524 in metal layer M1, VSS rail 526 in metal layer M1. The power grid structure of IC layout diagram 500A further includes a true power rail 530 (also referred to as TVDD rail) in metal layer M1. A true power rail is a power rail that is always ON when the IC is ON. For example, TVDD rail 530 is coupled to a power supply terminal of the IC without a switch in between. In contrast, one or more of VDD rail 514, VDD rail 524 are virtual power rails which are coupled to the power supply terminal of the IC via one or more switches configured to turn OFF the virtual power rails to save energy, e.g., when the IC is in an idle or sleep mode. IC layout diagram 500A further includes a cell with secondary power which is coupled to receive power from a true power rail. For example, cell 540 in IC layout diagram 500A is a cell with secondary power and is coupled to receive power from TVDD rail 530, via a power delivery structure including a via 551, a power delivery net 552 in metal layer M0, a via 553, a power delivery net 554 in metal layer M1, and a via 555. Examples of cells with secondary power are those with critical functions to be powered ON all the time while the IC is powered ON.

In some situations, there are few cells with secondary power in an IC, and locations of the cells with secondary power are limited to where a corresponding true power rail is located. Further, power delivery nets that couple a cell with secondary power to a true power rail are routed as signal nets in a routing operation, and have a narrower width than regular power rails of a power grid structure. For example, power delivery net 552 coupled between TVDD rail 530 and cell 540 has a width narrower than VDD rail 514 and VSS rail 516 in the same metal layer M0. The narrower width of power delivery net 552 increases the resistance and contributes to potential power-related issues, such as IR drop. In some embodiments, one or more of the described specifics of cells with secondary power are taken into account in power-aware refinement operation 150.

In at least one embodiment, power parameter calculation 154 determines an IR drop associated with a cell with secondary power as a power parameter to be considered in determining whether or not the IC layout diagram is to be modified. Cells with secondary power are considered directly, instead of a tile containing such cells, because the number of cells with secondary power in an IC layout diagram is small, and/or because the critical functions of such cells prompt an independent verification from other types of cells. To determine an IR drop of a cell with secondary power, such cell 540, the cell power of cell 540 is determined based on cell loading, as described herein with respect to cell loading estimation 152. An effective resistance of the power delivery structure between TVDD rail 530 and cell 540 is determined using KCL and KVL as described herein. An IR drop of cell 540 is determined based on the effective resistance, the power supply voltage TVDD, and the cell power, as described herein. When the determined IR drop exceeds an IR drop design criterion, IC layout diagram 500A is modified in IC layout diagram modification 156.

In the example configuration in FIG. 5B, IC layout diagram modification 156 modifies IC layout diagram 500A to include a further interconnection to connect cell 540 to TVDD rail 530, without altering a placement of cell 540 in the IC layout diagram. For example, an additional interconnection 562 is routed, e.g., as a signal net in a routing operation, in metal layer M0, and vias 561, 563 are added to couple TVDD rail 530 and power delivery net 554 in metal layer M1. As a result, instead of one interconnection 552 between TVDD rail 530 and power delivery net 554 in IC layout diagram 500A, modified IC layout diagram 500*b* includes two interconnections 552, 562 between TVDD rail 530 and power delivery net 554. The effective resistance of the power delivery structure between TVDD rail 530 and cell 540 is reduced which, in turn, reduces the IR drop of cell 540. Potential issues related to IR drop are thus addressable for cell 540. The addition of a further interconnection is selected for improving IR drop performance of a cell with secondary power, because such a cell is not to be moved or re-placed due to the cell's critical function and/or required proximity to TVDD rail 530. Other arrangements are, however, within the scopes of various embodiments.

In some embodiments, by performing power-aware refinement operation 150 before routing operation 128, it is possible to identify and correct potential power delivery issues at an early design stage. This is an improvement over other approaches where a power analysis is performed after routing operation 128, at sign-off operation 130. In accordance with the other approaches, if a potential power delivery issue is identified, a modification is made to the power grid structure at power planning operation 122 which, in turn, potentially causes related modifications at cell placement 124 and/or routing operation 128 with a long turn-around time. By performing power-aware refinement operation 150 before routing operation 128 in some embodiments, it is possible to make changes to the power grid structure and/or cell placement without re-routing the in IC layout diagram. The turnaround time is therefore shortened compared to the other approaches.

In some embodiments, power-aware refinement operation 150 is simply inserted in an initial design flow, without breaking the initial design flow. Therefore, it is possible to incorporate one or more embodiments in an existing design flow, with ease and without significant changes to the existing design flow.

In some embodiments, power-aware refinement operation 150 is performed after clock tree synthesis operation 126. In clock tree synthesis operation 126, a plurality of clock cells are added to the IC layout diagram. In some situations, clock cells consume more power than other cells placed in cell placement 124, and potentially have more power-related issues. By performing power-aware refinement operation 150 after clock tree synthesis operation 126, potential power-related issues associated with clock cells are identifiable and correctable, still at a stage sufficiently early to reduce the turnaround time compared to the other approaches.

In some embodiments, power-aware refinement operation 150 is performed both before and after clock tree synthesis operation 126, for increased accuracy.

In some embodiments, it is sufficient to use one of a power density or an IR drop as a power parameter in a power analysis for determining whether the IC layout diagram is to be modified to address potential power-related issues. In some embodiments, both the power density and the IR drop are used as the power parameter in the power analysis, for increased accuracy.

Figure 6:
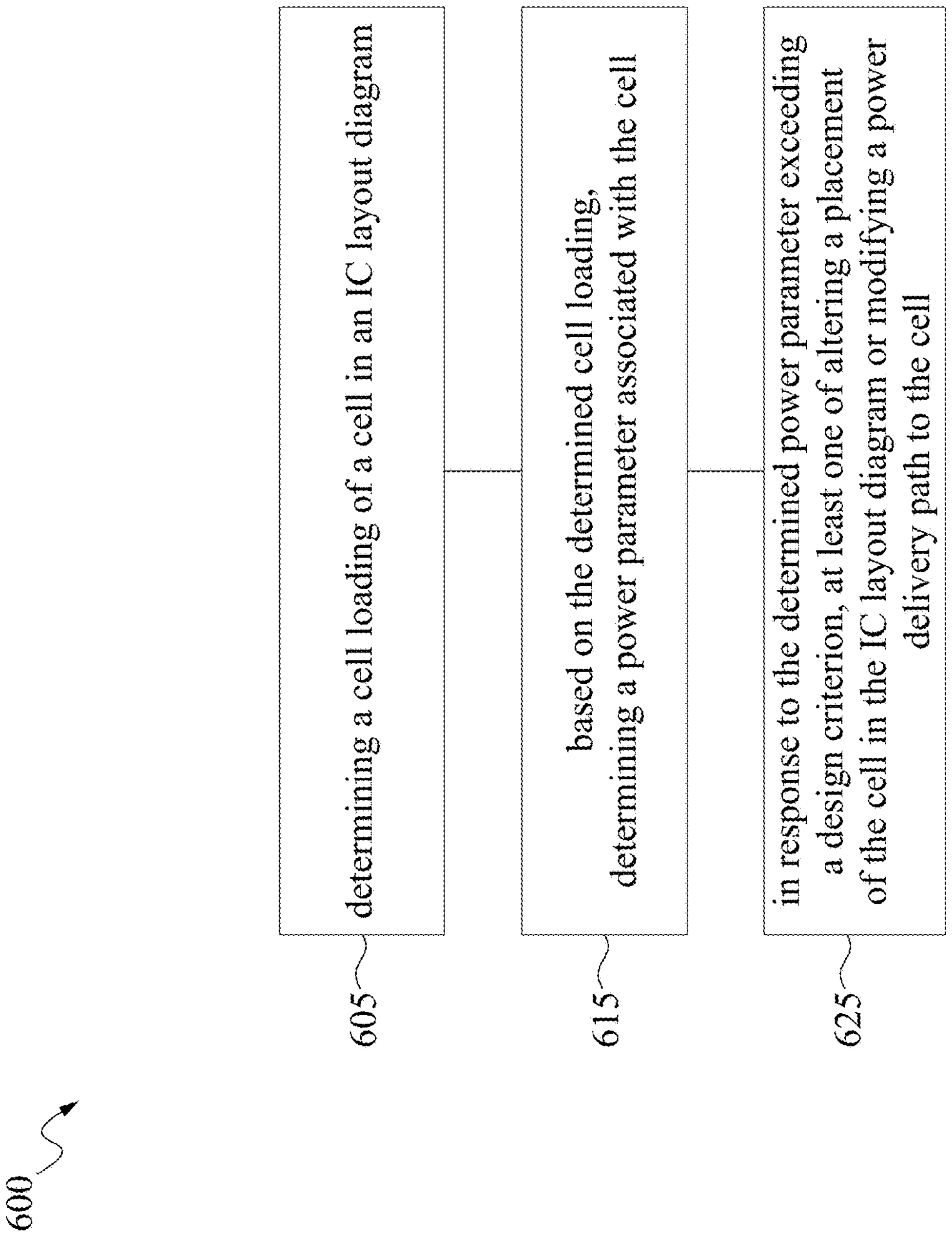
FIG. 6 is a flow chart of a method, in accordance with some embodiments.

FIG. 6 is a flow chart of a method 600, in accordance with some embodiments. In at least one embodiment, method 600 is performed in whole or in part by a processor as described herein.

At operation 605, a cell loading of a cell in an IC layout diagram is determined. For example, an EDA tool performs cell loading estimation 152, as described with respect to FIG. 1, to determine a cell loading of Cell 1 in IC layout diagram 200, as described with respect to FIG. 2A.

At operation 615, based on the determined cell loading, a power parameter associated with the cell is determined. For example, an EDA tool performs power parameter calculation 154, as described with respect to FIG. 1, to calculate a power parameter associated with the cell. In at least one embodiment, the power parameter associated with the cell includes a power density of a tile containing the cell, as described with respect to FIG. 2B. In at least one embodiment, the power parameter associated with the cell includes an IR drop of a tile containing the cell, as also described with respect to FIG. 2B. In at least one embodiment, the power parameter associated with the cell includes an IR drop of the cell, as described with respect to FIG. 5A.

At operation 625, in response to the determined power parameter exceeding a design criterion, at least one of altering a placement of the cell in the IC layout diagram or modifying a power delivery path to the cell is performed. For example, an EDA tool performs IC layout diagram modification 156, as described with respect to FIG. 1, to modify the IC layout diagram when a power-related design criterion is determined to be exceeded. In at least one embodiment, the IC layout diagram is modified by altering a placement of the cell in the IC layout diagram, as described with respect to FIGS. 3A-3B. In at least one embodiment, the IC layout diagram is modified by modifying a power delivery path to the cell, as described with respect to FIGS. 4A-4B and 5A-5B.

In at least one embodiment, all operations 605, 615, 625 are automatically performed without user input or intervention.

Figure 7:
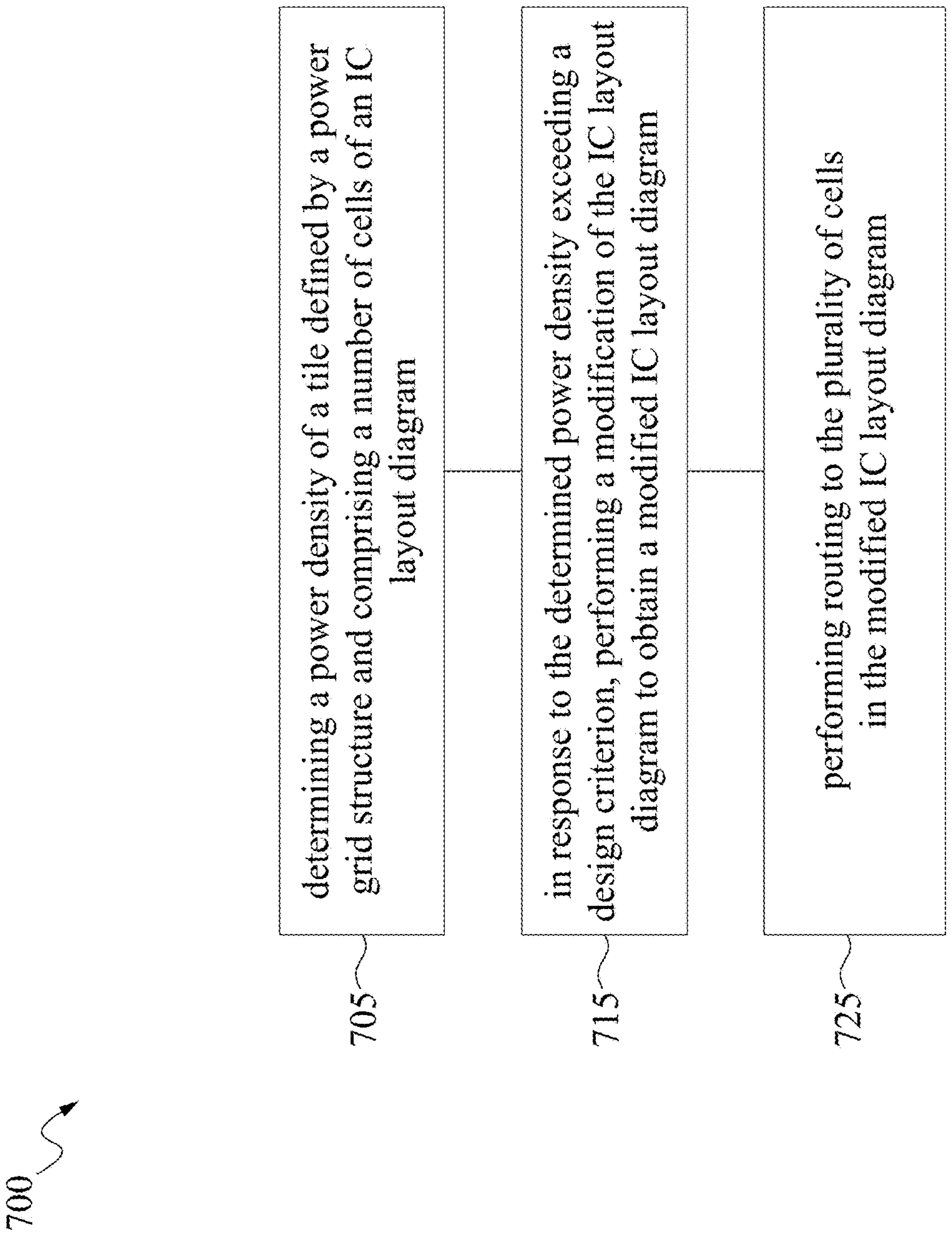
FIG. 7 is a flow chart of a method, in accordance with some embodiments.

FIG. 7 is a flow chart of a method 700, in accordance with some embodiments. In at least one embodiment, method 700 is performed in whole or in part by a processor as described herein.

At operation 705, a power density of a tile defined by a power grid structure and comprising a number of cells of an IC layout diagram is determined. For example, an EDA tool performs power parameter calculation 154, as described with respect to FIG. 1, to calculate a power density of a tile, as described with respect to FIG. 2B.

At operation 715, in response to the determined power density exceeding a design criterion, a modification of the IC layout diagram is performed to obtain a modified IC layout diagram. For example, an EDA tool performs IC layout diagram modification 156, as described with respect to FIG. 1, to modify the IC layout diagram when the determined power density exceeds a design criterion, as described with respect to one or more of FIGS. 3A-3B, FIGS. 4A-4B and 5A-5B.

At operation 725, routing to the plurality of cells in the modified IC layout diagram is performed. For example, an EDA tool performs routing operation 128 on the modified IC layout diagram resulted from power-aware refinement operation 150, as described with respect to FIG. 1.

In at least one embodiment, all operations 705, 715, 725 are automatically performed without user input or intervention.

Figure 8:
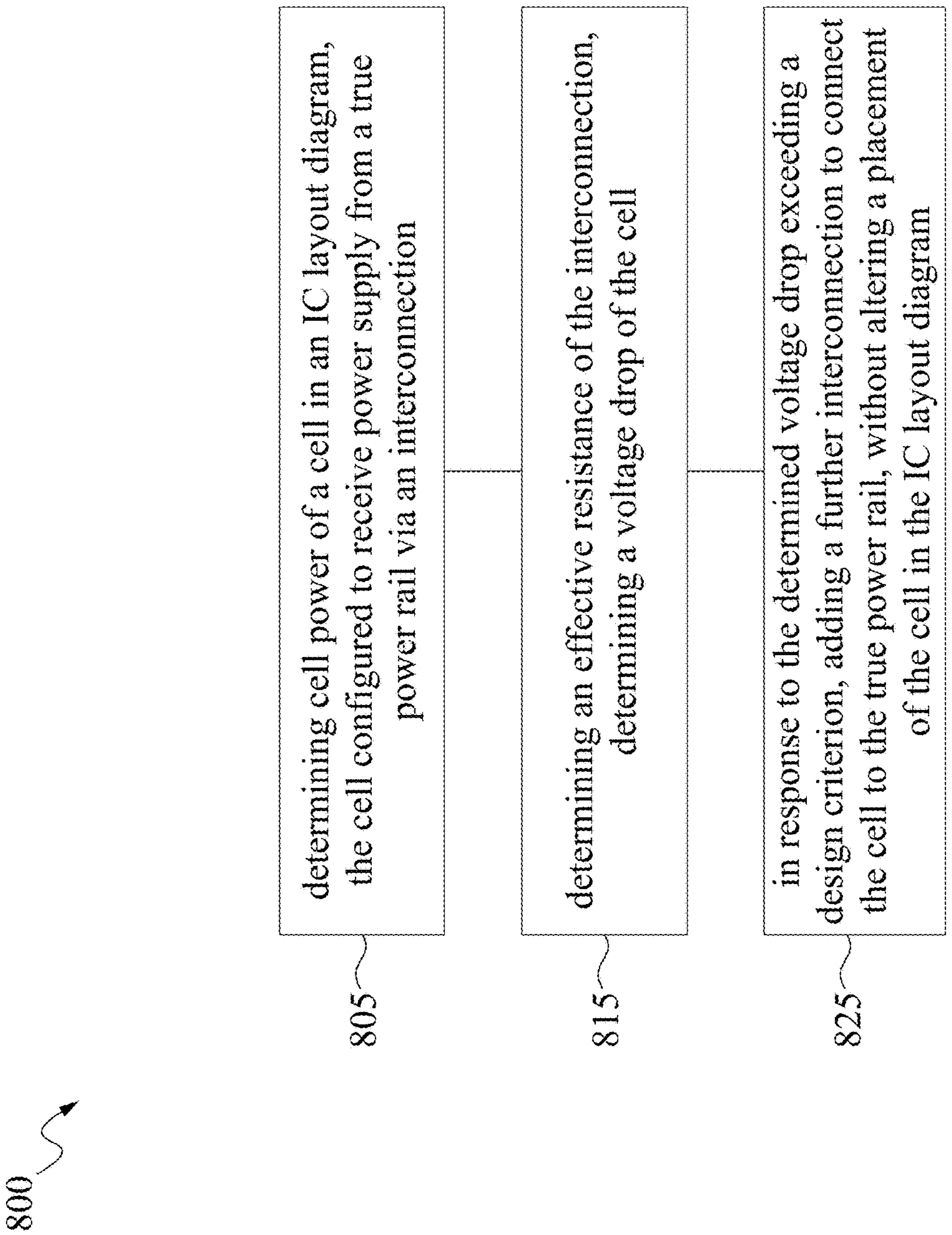
FIG. 8 is a flow chart of a method, in accordance with some embodiments.

FIG. 8 is a flow chart of a method 800, in accordance with some embodiments. In at least one embodiment, method 800 is performed in whole or in part by a processor as described herein.

At operation 805, cell power of a cell in an IC layout diagram is determined. The cell is configured to receive power supply from a true power rail via an interconnection. For example, cell power of a cell 540 with secondary power and configured to receive power supply from a TVDD rail 530 via an interconnection 552 is determined by an EDA tool, as described with respect to FIG. 5A.

At operation 815, an effective resistance of the interconnection and a voltage drop of the cell are determined by an EDA tool, for example, as described with respect to FIG. 5A.

At operation 825, in response to the determined voltage drop exceeding a design criterion, a further interconnection is added to connect the cell to the true power rail, without altering a placement of the cell in the IC layout diagram. For example, the determined voltage drop of cell 540 exceeds a design criterion, an EDA tool adds a further interconnection 562 to connect cell 540 to TVDD rail 530, without altering a placement of cell 540, as described with respect to FIG. 5B.

In at least one embodiment, all operations 805, 815, 825 are automatically performed without user input or intervention.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, at least one method(s) discussed above is performed in whole or in part by at least one EDA system. In some embodiments, an EAD system is usable as part of a design house of an IC manufacturing system discussed below.

Figure 9:
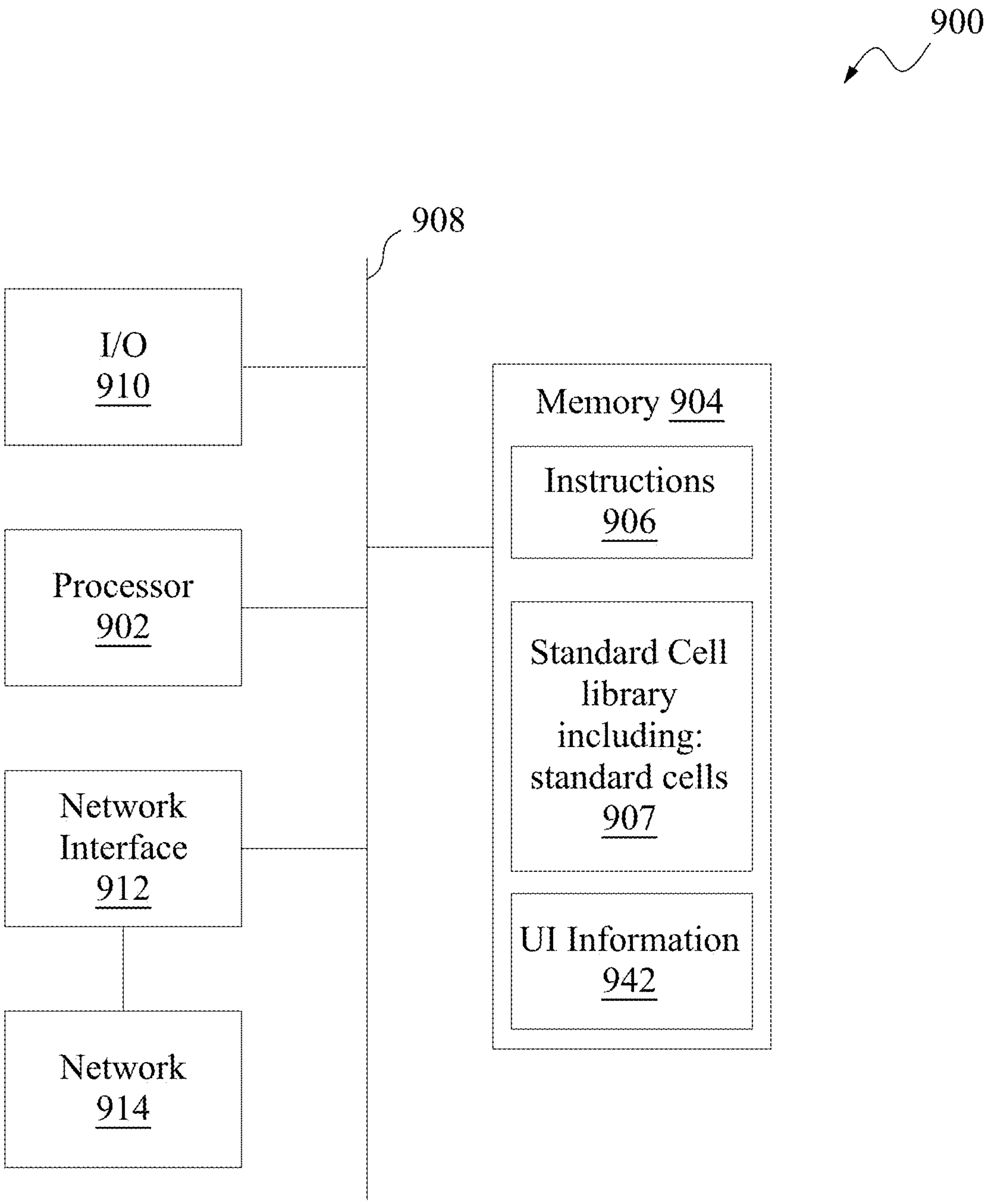
FIG. 9 is a block diagram of an EDA system, in accordance with some embodiments.

FIG. 9 is a block diagram of EDA system 900 in accordance with some embodiments. In some embodiments, EDA system 900 includes an automated placement and routing (APR) system.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of the methods described herein in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause EDA system 900 to perform a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause EDA system 900 (where such execution represents (at least in part) the EDA tool) to perform a portion or all of the noted processes and/or methods. In one or more embodiments, storage medium 904 also stores information which facilitates performing a portion or all of the noted processes and/or methods. In one or more embodiments, storage medium 904 stores a library 907 of standard cells.

EDA system 900 includes I/O interface 910. In one or more embodiments, I/O interface 910 includes an input device, an output device and/or a combined input/output device for enabling a user and/or external circuitry/equipment to interact with EDA system 900. An input device comprises, for example, a keyboard, keypad, mouse, trackball, trackpad, touchscreen, and/or cursor direction keys for communicating information and commands to processor 902. An output device comprises, for example, a display, a printer, a voice synthesizer, etc. for communicating information to a user.

EDA system 900 also includes network interface 912 coupled to processor 902. Network interface 912 allows EDA system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA systems 900.

EDA system 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to output to and/or receive information from a user through a user interface (UI). The UI comprises I/O interface 910 and information related to UI stored in computer-readable medium 904 as UI information 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
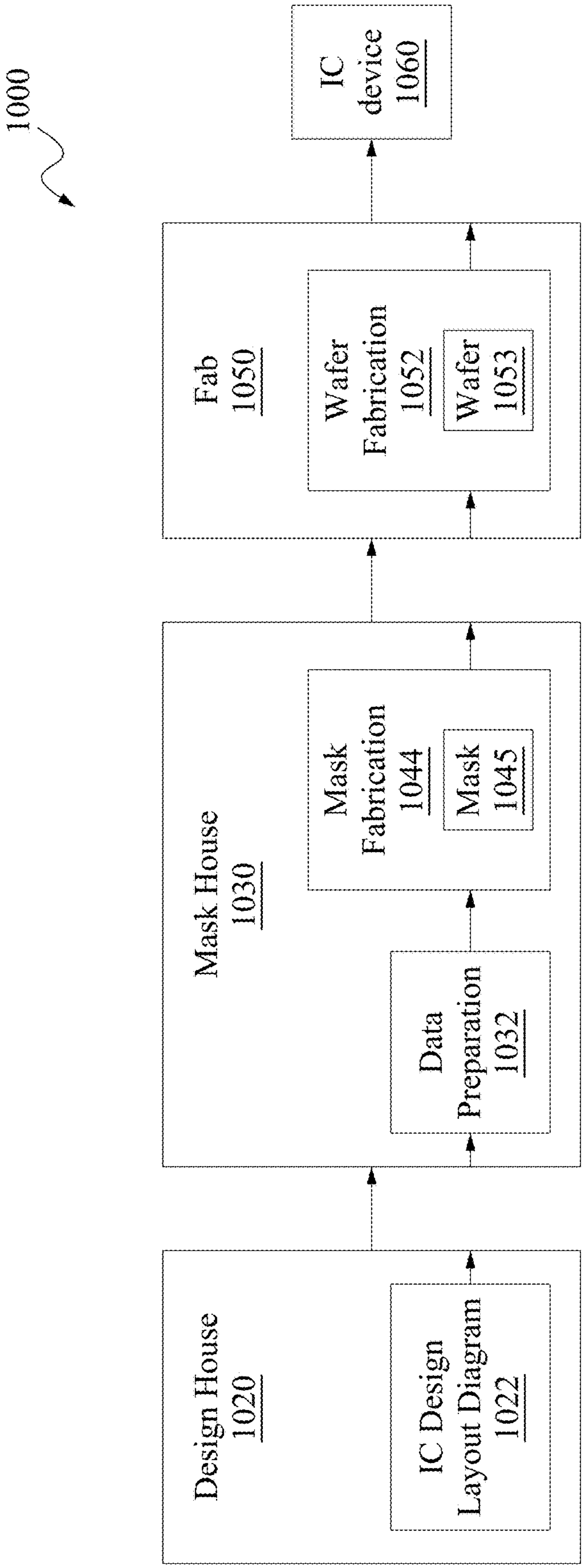
FIG. 10 is a block diagram of an IC manufacturing system and an IC manufacturing flow associated therewith, in accordance with some embodiments.

FIG. 10 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 10, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns designed for IC device 1060. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place and route. IC design layout diagram 1022 is presented in one or more data files having information of the geometrical patterns. For example, IC design layout diagram 1022 is expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC device 1060 according to IC design layout diagram 1022. Mask house 1030 performs mask data preparation 1032, where IC design layout diagram 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 10, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 includes wafer fabrication 1052. IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses mask(s) 1045 fabricated by mask house 1030 to fabricate IC device 1060. Thus, IC fab 1050 at least indirectly uses IC design layout diagram 1022 to fabricate IC device 1060. In some embodiments, semiconductor wafer 1053 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multilevel interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method executed at least partially by a processor comprises determining a power parameter associated with a cell in an integrated circuit (IC) layout diagram. In response to the determined power parameter exceeding a design criterion, the method further comprises performing a modification of the IC layout diagram, the modification comprising at least one of altering a placement of the cell in the IC layout diagram or modifying a power delivery path to the cell. The determining the power parameter is performed before a routing operation in the IC layout diagram.

In some embodiments, a system comprises a processor. The processor is configured to determine a power density of a tile comprising a number of cells among a plurality of cells of an integrated circuit (IC) layout diagram. The processor is further configured to, in response to the determined power density exceeding a design criterion, perform a modification of the IC layout diagram to obtain a modified IC layout diagram. The processor is further configured to perform routing to the plurality of cells in the modified IC layout diagram.

In some embodiments, a computer program product comprises a non-transitory, computer-readable storage medium containing instructions therein. The instructions, when executed by a processor, cause the processor to determine a voltage drop of a cell in an integrated circuit (IC) layout diagram, the cell configured to receive power supply from a true power rail via an interconnection. The instructions further cause the processor to, in response to the determined voltage drop exceeding a design criterion, perform a modification of the IC layout diagram. The modification comprises adding a further interconnection to connect the cell to the true power rail.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method executed at least partially by a processor, the method comprising:

determining a power parameter associated with a cell in an integrated circuit (IC) layout diagram; and in response to the determined power parameter exceeding a design criterion, performing a modification of the IC layout diagram, the modification comprising at least one of altering a placement of the cell in the IC layout diagram or modifying a power delivery path to the cell, wherein the determining the power parameter is performed before a routing operation in the IC layout diagram.

2. The method of claim 1, further comprising:

after the performing the modification of the IC layout diagram, performing a clock tree synthesis on the IC layout diagram.

3. The method of claim 1, further comprising:

before the determining the power parameter, performing a clock tree synthesis on the IC layout diagram, and after the performing the modification of the IC layout diagram, performing the routing operation in the IC layout diagram.

4. The method of claim 1, further comprising:

performing a clock tree analysis in the IC layout diagram before the routing operation, wherein the determining the power parameter is performed both before and after the clock tree analysis.

5. The method of claim 1, further comprising:

performing a cell placement operation to place a plurality of cells from one or more cell libraries into the IC layout diagram; and then performing a clock tree analysis which comprises adding a plurality of clock cells to the IC layout diagram, wherein the determining the power parameter is performed after the clock tree analysis, and the cell with which the power parameter is associated is a clock cell among the plurality of clock cells.

6. The method of claim 1, wherein the cell is one cell among a plurality of cells in the IC layout diagram, and the altering the placement of the cell in the IC layout diagram comprises increasing a space in the IC layout diagram between the cell and a further cell among the plurality of cells.

7. The method of claim 1, wherein the modifying the power delivery path to the cell comprises adding at least one of a power rail or a power delivery via to the IC layout diagram to deliver power to the cell.

8. The method of claim 1, wherein the modifying the power delivery path to the cell comprises adding, to the IC layout diagram, at least one power rail as a signal net in the routing operation in the IC layout diagram, to deliver power to the cell.

9. A system, comprising a processor configured to:

determine a power density of a tile comprising a number of cells among a plurality of cells of an integrated circuit (IC) layout diagram, in response to the determined power density exceeding a design criterion, perform a modification of the IC layout diagram to obtain a modified IC layout diagram, and perform routing to the plurality of cells in the modified IC layout diagram.

10. The system of claim 9, wherein the processor is further configured to:

perform a clock tree synthesis on the IC layout diagram before determining the power density of the tile.

11. The system of claim 9, wherein the processor is further configured to:

perform a clock tree synthesis on the modified IC layout diagram before performing the routing to the plurality of cells in the modified IC layout diagram.

12. The system of claim 9, wherein, in the modification of the IC layout diagram, the processor is further configured to:

alter cell placement locally for the tile which has the determined power density exceeding the design criterion.

13. The system of claim 9, wherein, in the modification of the IC layout diagram, the processor is further configured to:

alter placement of at least one cell of the tile, by increasing a space in the IC layout diagram between the at least one cell and at least one further cell of the tile.

14. The system of claim 9, wherein, in the modification of the IC layout diagram, the processor is further configured to:

modify a power delivery path locally for the tile which has the determined power density exceeding the design criterion.

15. The system of claim 9, wherein, in the modification of the IC layout diagram, the processor is further configured to:

modify a power delivery path to at least one cell of the tile, by adding at least one of a power rail or a power delivery via to the IC layout diagram to deliver power to the at least one cell.

16. A computer program product, comprising a non-transitory, computer-readable storage medium containing instructions therein which, when executed by a processor, cause the processor to:

determine a voltage drop of a cell in an integrated circuit (IC) layout diagram, the cell configured to receive power supply from a true power rail via an interconnection, and in response to the determined voltage drop exceeding a design criterion, perform a modification of the IC layout diagram, the modification comprising adding a further interconnection to connect the cell to the true power rail.

17. The computer program product of claim 16, wherein the instructions, when executed by the processor, further cause the processor to:

add the further interconnection as a signal net in a routing operation in the IC layout diagram.

18. The computer program product of claim 16, wherein the instructions, when executed by the processor, further cause the processor to:

perform power planning which comprises generating, in the IC layout diagram, a power grid structure including power rails extending in transverse directions, wherein the further interconnection has a narrower width than the power rails of the power grid structure.

19. The computer program product of claim 16, wherein the instructions, when executed by the processor, further cause the processor to:

determine a cell loading of the cell based on (i) a logical connection of an output of the cell to a further cell among a plurality of cells in the IC layout diagram, and (ii) a distance in the IC layout diagram between the cell and the further cell, based on the determined cell loading, determine at least one of a switching power of the cell or an internal power of the cell, and based on the determined at least one of the switching power or the internal power of the cell, determine cell power of the cell.

20. The computer program product of claim 19, wherein the instructions, when executed by the processor, further cause the processor to:

determine a current value of the cell based on (i) the determined cell power of the cell and (ii) a power supply voltage of the true power rail, and based on the determined current value and an effective resistance of the interconnection, determine the voltage drop of the cell.

* * * * *